United States Patent
Wagner et al.

(10) Patent No.: US 11,195,072 B1
(45) Date of Patent: Dec. 7, 2021

(54) INTERNAL RADIO-FREQUENCY INSTRUMENTATION SYSTEM AND METHOD

(71) Applicant: USA as represented by the Administrator of the National Aeronautics and Space Administration, Washington, DC (US)

(72) Inventors: Raymond S Wagner, Houston, TX (US); David S Hafermalz, Houston, TX (US); Patrick W. Fink, Missouri City, TX (US); Chad Zalkin, Houston, TX (US); Ray Seegmiller, Houston, TX (US)

(73) Assignee: United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 16/287,456

(22) Filed: Feb. 27, 2019

Related U.S. Application Data

(60) Provisional application No. 62/636,489, filed on Feb. 28, 2018.

(51) Int. Cl.
*G06K 19/07* (2006.01)
*H04W 52/02* (2009.01)

(52) U.S. Cl.
CPC ..... *G06K 19/0705* (2013.01); *G06K 19/0712* (2013.01); *G06K 19/0715* (2013.01); *G06K 19/0723* (2013.01); *H04W 52/0229* (2013.01)

(58) Field of Classification Search
CPC ................................. G06K 19/0705
See application file for complete search history.

(56) References Cited

U.S. PATENT DOCUMENTS

| | | |
|---|---|---|
| 7,494,064 B2 | 2/2009 | Slutsky et al. |
| 7,495,558 B2 | 2/2009 | Pope et al. |

(Continued)

FOREIGN PATENT DOCUMENTS

| | | |
|---|---|---|
| AU | 201095398 A1 | 4/2012 |
| AU | 2013364131 A2 | 10/2015 |

(Continued)

OTHER PUBLICATIONS

R. S. Wagner, D. S. Hafermalz, N. J. Champagne and R. Seegmiller, "Internal radio-frequency Instrumentation System (IRIS): RFID-enabled wireless vehicle instrumentation," 2017 IEEE Aerospace Conference, Big Sky, MT, USA, 2017, pp. 1-12, doi: 10.1109/AERO.2017.7943880. (Year: 2017).*

(Continued)

*Primary Examiner* — Daniell L Negron
(74) *Attorney, Agent, or Firm* — Kurt G. Hammerle; Edward K. Fein

(57) ABSTRACT

A method for streaming sensor data from a set of radio-frequency identification (RFID) tags includes determining an initial communication approach to be performed with respect to each RFID tag. The method also includes managing access to the RFID tag by refining the initial communication approach based on records of successes and failures of the initial communication approach. A radio-frequency identification (RFID) system is also disclosed, the system comprising one or more processors and a memory system comprising one or more non-transitory computer-readable media storing instructions that, when executed by at least one of the one or more processors, causes the system to perform operations for streaming sensor data from one or more RFID tags to one or more RFID readers.

10 Claims, 6 Drawing Sheets

(56) References Cited

U.S. PATENT DOCUMENTS

| | | | |
|---|---|---|---|
| 7,859,404 | B2 | 12/2010 | Chul et al. |
| 8,390,433 | B2 | 3/2013 | Warner et al. |
| 8,410,911 | B2 | 4/2013 | Ojeda et al. |
| 8,421,629 | B2 | 4/2013 | Carr |
| 8,456,282 | B2 | 6/2013 | Burkart et al. |
| 9,558,382 | B2 | 1/2017 | Koviacic et al. |
| 2001/0050580 | A1 | 12/2001 | O'toole et al. |
| 2008/0028157 | A1* | 1/2008 | Steinmetz ............ H04L 49/253 711/149 |
| 2012/0242453 | A1 | 9/2012 | Delgado et al. |
| 2012/0286939 | A1 | 11/2012 | Cote et al. |
| 2014/0125458 | A1 | 5/2014 | Bachaman et al. |
| 2015/0116296 | A1 | 4/2015 | Greene |
| 2015/0227480 | A1 | 8/2015 | Whitaker et al. |
| 2015/0347791 | A1 | 12/2015 | Desai et al. |
| 2016/0321480 | A1* | 11/2016 | Hamlin ................. G16H 10/40 |
| 2017/0069952 | A1 | 3/2017 | Tunnell et al. |

FOREIGN PATENT DOCUMENTS

| | | |
|---|---|---|
| CN | 203799486 U | 8/2014 |
| EP | 2509032 B1 | 3/2016 |
| WO | WO2006039059 A1 | 4/2006 |
| WO | WO2013064732 A2 | 5/2013 |

OTHER PUBLICATIONS

Rabaey, J., et al. "Ultra-low-power design," iEEE Circuits and Devices Magazine 22.4 (2006); 23-29.

Sanchez, Antonio, et al. "An Ultra-Low Power and Flexible Acoustic Modem Design to Develop Energy-Efficient Underwater Sensor Networks." Sensors 12 (2012); 6837-6856.

Jankowski-Milulowicz Piotr, et al. "Modelling and design of HF RFID passive transponders with additional energy harvester." International Journal of Antennas and Propagation 2013 (2013).

Sample, Alanson, et al. "Development of Sensing and Computing Enhanced Passive RFID Tags Using the Wireless Identification and Sensing Platform." Development and Implementation of RFID Technology. InTech, 2009.

Christmann, Jean-Frederic, et al. "Bringing robustness and power efficiency to autonomous energy harvesting microsystems." Asynchronous Circuits and Systems (SYNC), 2010 IEEE Symposium on. IEEE, 2010.

Wagner, et al. "Delay Tolerant, Redo Frequency Idenfitication (RFID)-enabled Sensing", 2014 IEEE Internatonal Confrence on Wireless for Space and Extreme Environments (WiSEE), 2014.

Martinez, E.R., Santos, J.A., David, R., and Mojarradi, M.; Challenge of Developmental Flight Instrumentation for Orion Exploration Flight Test 1: Potential Benefit of Wireless Technology for Future Orion Missions. Proc. of IEEE WiSEE, Oct. 2014.

Dementyev, A., Hodges, S., Taylor, S., and Smith, J.; Power Consumption Analysis of Bluetooth Low Energy, ZigBee and ANT Sensor Nodes in a Cyclic Sleep Scenario. Proc. of IEEE IWS, Apr. 2013.

AMS SL900A product datasheet, http://ams.com/eng/content/download/755603/1912935/194277.

Impinj Monza-X 8k product datasheet, https://support.impinj.com/hc/en-us/article_attachments/203382667/Monza_X-8K_Dura_Datasheet_20150526_R3.pdf.

Fujitsu MB97R804A/MB97R804B product datasheet, http://www.fujitsu.com/downloads/MICRO/fme/fram/ds-mb97r803ab-mb97r804ab.pdf.

Wagner, Raymond, "Internal Radio-frequency Instrumentation System (IRIS) Overview," In-Space Inspection Workshop 2017.

* cited by examiner

INTERNAL RADIO-FREQUENCY INSTRUMENTATION SYSTEM AND METHOD

CROSS-REFERENCE TO RELATED APPLICATIONS

This application claims priority to U.S. Provisional Patent Application No. 62/636,489, filed on Feb. 28, 2018, the entirety of which is incorporated by reference herein.

ORIGIN OF THE INVENTION

The invention described herein was made by employee(s) of the United States Government and may be manufactured and used by or for the Government of the United States of America for governmental purposes without the payment of any royalties thereon or therefor.

BACKGROUND

Wireless systems and methods are currently used in vehicles, buildings, towers, appliances, etc. to provide communication. Wireless systems and methods may also provide a benefit to vehicles and other host structures (e.g., cars, aircrafts, bridges, appliances, etc.) by reducing the overall weight. Specifically, eliminating wiring used for power and communication of data may allow more data channels per a given mass allocation for an instrumentation system or, conversely, less mass for a given data channel list and therefore make more space or mass available in the host structure for other purposes. What is needed, therefore, is an improved system and method for wireless transfer of power and communication of data.

SUMMARY

A method for accessing sensor data is disclosed. The method includes determining an initial communication approach to be performed with respect to a radio-frequency identification (RFID) tag. The method also includes managing access to the RFID tag by refining the initial communication approach based on records of successes and failures of the initial communication approach.

A method for performing a low-power wake-up and data interrogation is also disclosed. The method includes determining a responsiveness of a plurality of radio-frequency identification (RFID) tags to over-the-air RFID access using an RFID reader. The method also includes generating an access strategy for each RFID tag in response to the responsiveness of each RFID tag to over-the-air RFID access. The method also includes waking each RFID tag up in response to a command from the RFID reader. The method also includes synchronizing a sampling clock of each RFID tag in response to a command from the RFID reader. The method also includes causing the sampling clock of each RFID tag to begin sampling in response to a command from the RFID reader. The method also includes reading a memory of each RFID tag with the RFID reader.

A method for performing a low-power hibernation and data streaming is also disclosed. The method includes receiving, at a radio-frequency identification (RFID) tag, a wake-up command from an RFID reader. The wake-up command includes a periodic action. The method also includes synchronizing a sampling clock of the RFID tag with a sampling clock of the RFID reader in response to the wake-up command. The method also includes acquiring a block of data samples using the RFID tag. The method also includes writing the block of data samples into a memory of the R FID tag.

A radio-frequency identification (RFID) system is also disclosed, the system including in one embodiment one or more RFID readers and one or more RFID tags. The system comprises one or more processors; and a memory system comprising one or more non-transitory computer-readable media storing instructions that, when executed by at least one of the one or more processors, causes the system to perform operations. The operations comprise in one embodiment the following actions: (1) receiving, at an RFID tag, a wake-up command from an RFID reader, wherein the wake-up command comprises a periodic action; (2) synchronizing a sampling clock of the RFID tag with a sampling clock of the RFID reader in response to the wake-up command; (3) acquiring a block of data samples using the RFID tag; and (4) writing the block of data samples into a memory of the RFID tag.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

The following figures form part of the present specification and are included to further demonstrate certain aspects of the presently described subject matter and should not be used to limit it. The present subject matter may be better understood by reference to one or more of these drawings in combination with the description of embodiments presented herein. Consequently, a more complete understanding of the present embodiments and further features and advantages thereof may be acquired by referring to the following description taken in conjunction with the accompanying drawings, in which like reference numerals may identify like elements, wherein.

DETAILED DESCRIPTION

Figure 1:
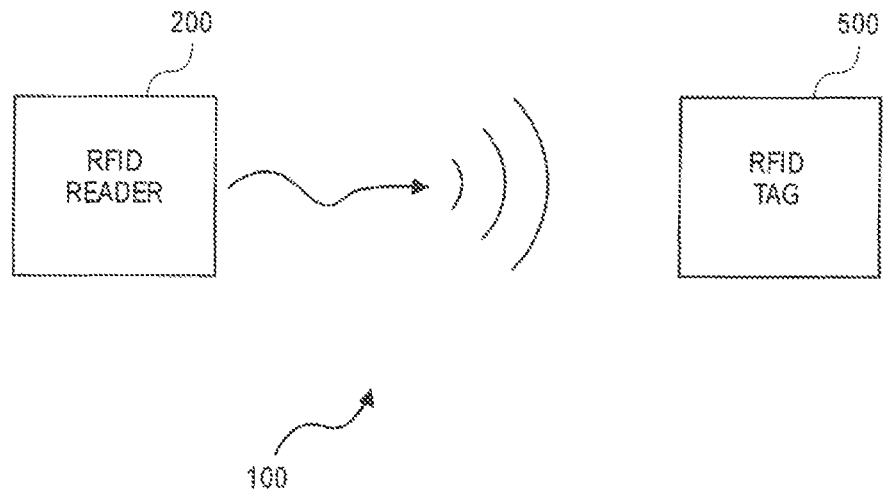
FIG. 1 illustrates a schematic view of a radio frequency identification (RFID)-enabled information collection system including an RFID reader/interrogator and an RFID tag, according to an embodiment. The system may be referred to herein as an Internal Radio-Frequency Instrumentation System (IRIS).

Reference will now be made in detail to specific embodiments illustrated in the accompanying drawings and figures. In the following detailed description, numerous specific details are set forth in order to provide a thorough understanding of the embodiments described herein. However, it will be apparent to one of ordinary skill in the art that other embodiments may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object could be termed a second object, and, similarly, a second object could be termed a first object, without departing from the scope of the present disclosure.

The terminology used herein is for the purpose of describing particular embodiments only and is not intended to be limiting. As used in the description and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, operations, elements, components, and/or groups thereof. Further, as used herein, the term "if" may be construed to mean "when" or "upon" or "in response to determining" or "in response to detecting," depending on the context.

As used herein, the terms "inner" and "outer"; "up" and "down"; "upper" and "lower"; "upward" and "downward"; "above" and "below"; "inward" and "outward"; and other like terms as used herein refer to relative positions to one another and are not intended to denote a particular direction or spatial orientation. The terms "couple," "coupled," "connect," "connection," "connected," "in connection with," and "connecting" refer to "in direct connection with" or "in connection with via one or more intermediate elements or members."

The systems and methods disclosed herein include a radio-frequency identification (RFID) reader (also referred to herein as an interrogator) and an RFID tag that provide RFID-enabled information collection that can be used for monitoring and gathering data wirelessly from a host structure. Examples of a host structure may be or include the structural members, pressure vessel, and heat shield of a crewed or robotic spacecraft or similar elements of a space habitat. Such systems and methods may operate at low power for long durations by implementing a first protocol for low-power hibernation and a second protocol for low-power data streaming.

Protocol for Low-Power Hibernation

Embodiments disclosed herein provide a long-lived wireless RFID-enabled sensor system that may hibernate at low power for months or years after installation into a host structure. The sensor system may also allow for instantaneous wakeup during system checkouts before transport and then again at the start of the planned use. The embodiments disclosed herein, referred to herein collectively as the Internal Radio-Frequency Instrumentation System or "IRIS" for short, may use a serial-addressable RFID interface in an RFID tag so that the RFID reader can "wake up" a "sleeping" wireless sensor that has been placed into long-term, low-power hibernation. The wireless sensor may be part of the RFID tag.

In at least one embodiment, the (e.g., wireless) RFID tag may include a low-power microcontroller unit (MCU), one or more sensors, a power supply, and a serial-addressable RFID integrated circuit (IC) for transmitting sensor data (i.e., a telemetry interface) and for implementing a wakeup channel (i.e., a wakeup interface). In the hibernating configuration, the MCU may be the only element in the RFID tag that draws power, and the MCU may be operating in the lowest power mode possible. In at least one embodiment, in the lowest possible power mode, either nothing happens, or a watchdog timer is monitored to ensure that the processor can be reset in the event of a software problem. When it is time to bring the RFID tag into an active (e.g., higher-power) state, the RFID reader transmits (i.e., writes) a configuration command into one of the memory banks of the RFID tag (e.g., the user memory (UM) bank optionally included in the EPC Global Class 1 Generation 2 (C1G2) protocol). Upon detection of this event, the MCU reads out the configuration command from the RFID reader and engages the telemetry interface as appropriate to the command. By using a passive channel afforded by the wakeup interface, the sensor device may avoid the significant power draw of periodically turning on its wakeup channel, connecting to the RFID reader (i.e., the master device), and checking for pending wakeup messages.

A passive wakeup channel can also have one additional advantage: some models of serial-addressable RFID IC can be configured to generate a "wakeup pulse" on one of the serial input/output lines when a particular data sequence is written over-the-air (OTA) to an RFID IC of the RFID tag. In one embodiment, this pulse may be generated by using power harvested from the RFID reader, and the MCU can be configured to generate and service a hardware interrupt on detection of that pulse. This configuration provides an extremely low-latency wakeup capability, because detection of the wakeup command may be handled entirely via the hardware. Other models lack this feature, which means the MCU may be configured to periodically wake up and read the contents of a fixed block of tag memory for new configuration commands. Although this type of embodiment cycles the MCU through its active state more often, the power required to do so is much less than if an active radio channel were powered on as well. Also, the time taken to read the configuration register may be much shorter than the connection time of a protocol such as Bluetooth® Low Energy (BLE), so the average time spent in the active period checking for new configuration commands is much shorter. The wakeup period can be adjusted to provide the desired latency in decoding and acting upon configuration commands.

Protocol for Low-Power Data Streaming

Once the RFID tag (e.g., the sensor in the tag) has been awakened, it is then ready to begin collecting and transmitting data (e.g., health, status, and/or sensor data) back to the RFID reader for storage and, if applicable, analysis/interpretation. In at least one embodiment, the telemetry interface of the serial-addressable RFID IC may be used for transmitting or "streaming" this sensor data.

In the case of the wakeup interface, information flows from the RFID reader to the sensor node processor via the RFID interface. More particularly, a wakeup command may be written to the RFID tag (e.g., in the user memory (UM) bank of a C1G2 RFID tag). The tag processor or MCU is then either awakened via a hardware interrupt triggered by a signal from an RFID IC or periodically wakes itself up to check for new messages. Next, the tag processor or MCU reads the contents of the UM bank to recover the wakeup command.

In the case of the telemetry interface, information flows from the sensor node to the RFID reader. Once the sensor node has awakened into data-gathering mode, it begins sampling its sensors and accumulating sampled sensor data. At an application-specific interval, this sensor data may be written over the serial interface to the RFID IC (e.g., in the UM area). The operation may then rely on the RFID reader to read out the relevant section of UM using the OTA interface before the processor of the RFID tag is ready to overwrite it with a new block of sample data. This operation effectively implements a data "streaming" service where sensor data is constantly generated and sent OTA to the RFID reader. It stands in contrast to typical RFID sensing applications where individual data points are gathered and transmitted to an RFID reader on demand, or a fixed block of data is gathered once and then stored for offline download to an RFID reader at a later time. As discussed previously, the power required to write over the serial interface into the tag memory is significantly less than the power required to drive an active radio channel. In at least one embodiment, the power required to transport the sensor data OTA to the RFID reader can be provided by the RFID reader itself due to the passive nature of the RFID tag and the low-power operation. Therefore, in addition to the low-power wakeup interface, the sensor processor may have a very low-power mechanism (or telemetry interface) for transporting sensor data back to the RFID reader. This operation is similar to the services of more common active radios (e.g., BLE), but it is achieved at a fraction of power cost to the wireless sensor device.

One single RFID reader may be configured to communicate with a plurality of RFID tags. For each tag, the RFID reader may first issue a sampling command using the wakeup interface. The RFID reader may then use the sample period for that tag to schedule subsequent tag reads to recover the sensor data buffered from the previous sampling period before the tag processor is ready to overwrite the tag memory with the data buffered from the current sampling period. Retries for failed read attempts may be rescheduled, and the RFID reader may not schedule reads when the tag serial interface is used to transfer data from the processor to the memory of the RFID IC where the data is buffered. Otherwise, a collision may be mediated according to the priorities of the specific serial-addressable RFID IC used to build the sensor tag device.

Taken together, RFID-enabled wakeup and RFID-enabled data streaming provide low power wireless sensor devices that can operate (e.g., both hibernating and actively gathering data) for a long time on an expendable battery. The system may also operate indefinitely on harvested power when placed in environments where sufficient sources of ambient power can be realized.

FIG. 1 illustrates a schematic view of a radio frequency identification (RFID)-enabled information collection system 100 including an RFID reader (also referred to herein as an interrogator) 200 and an RFID tag 500, according to an embodiment. The system 100 may be referred to herein as an Internal Radio-Frequency Instrumentation System (IRIS). The system 100 may be configured to collect/acquire, receive, and/or transmit data ("stream") at a rate up to several thousand samples per second from each of a plurality of sensor devices.

Figure 2:
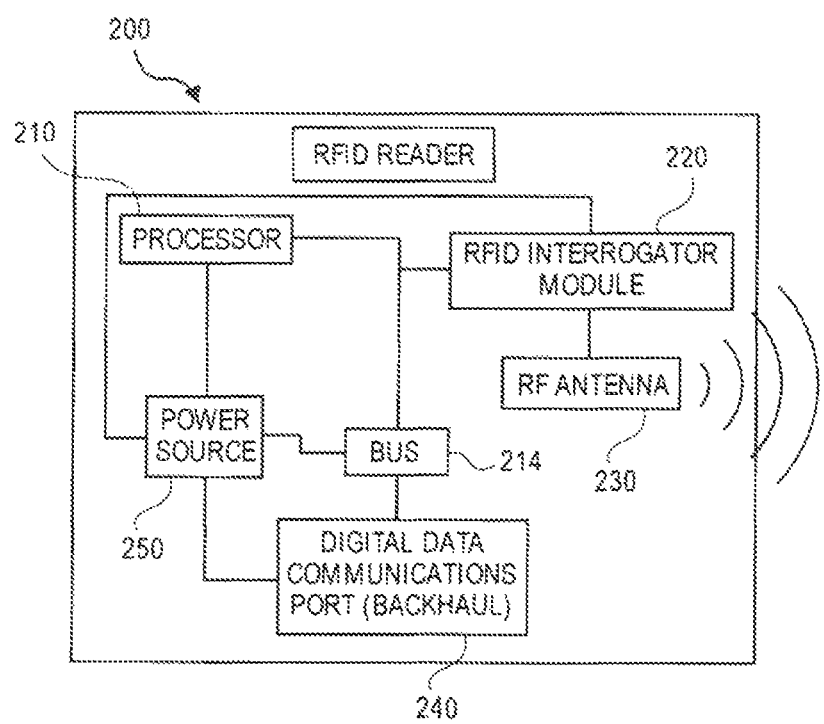
FIG. 2 illustrates a schematic view of the RFID reader from FIG. 1, according to an embodiment.

FIG. 2 illustrates a schematic view of the RFID reader 200, according to an embodiment. The RFID reader 200 may include a central processing unit (CPU) or microprocessor 210, at least one RFID interrogator module 220, at least one RF antenna 230, a digital data communications port or backhaul network 240, a communication bus 214, and a power source 250.

The processor 210 may include a set of instructions for implementing and performing the steps of functionality outlined below. The processor 210 may be embodied as an application-specific integrated circuit (ASIC) chip, a field programmable gate array (FPGA), a microcontroller unit (MCU), a single board computer, or such other computing mechanism capable of storing in a memory integrated thereto a set of instructions written in human-readable format (e.g., source code, VHDL) and converting such instructions into a set of machine-readable digital instructions (e.g., binary code) for operating the RFID reader 200.

The at least one RFID interrogator module 220 may include either a distinct integrated circuit connected via the bus 214 (e.g., serial interface) or a circuit module internal to the processor 210.

Each RF antenna 230 may interface to/with the RFID interrogator module 220 and may be configured to send command sequences to the RFID tag 500. The RF antenna 230 may also be configured to receive transmitted information collected and transmitted by the RFID tag 500.

The digital data communications port or backhaul network 240 may be operatively connected to the processor 210 and the RFID interrogator module 220 to "offload" collected sensor data that is either wired (e.g., via Ethernet) or wireless (e.g., via Wi-Fi).

Figure 3:
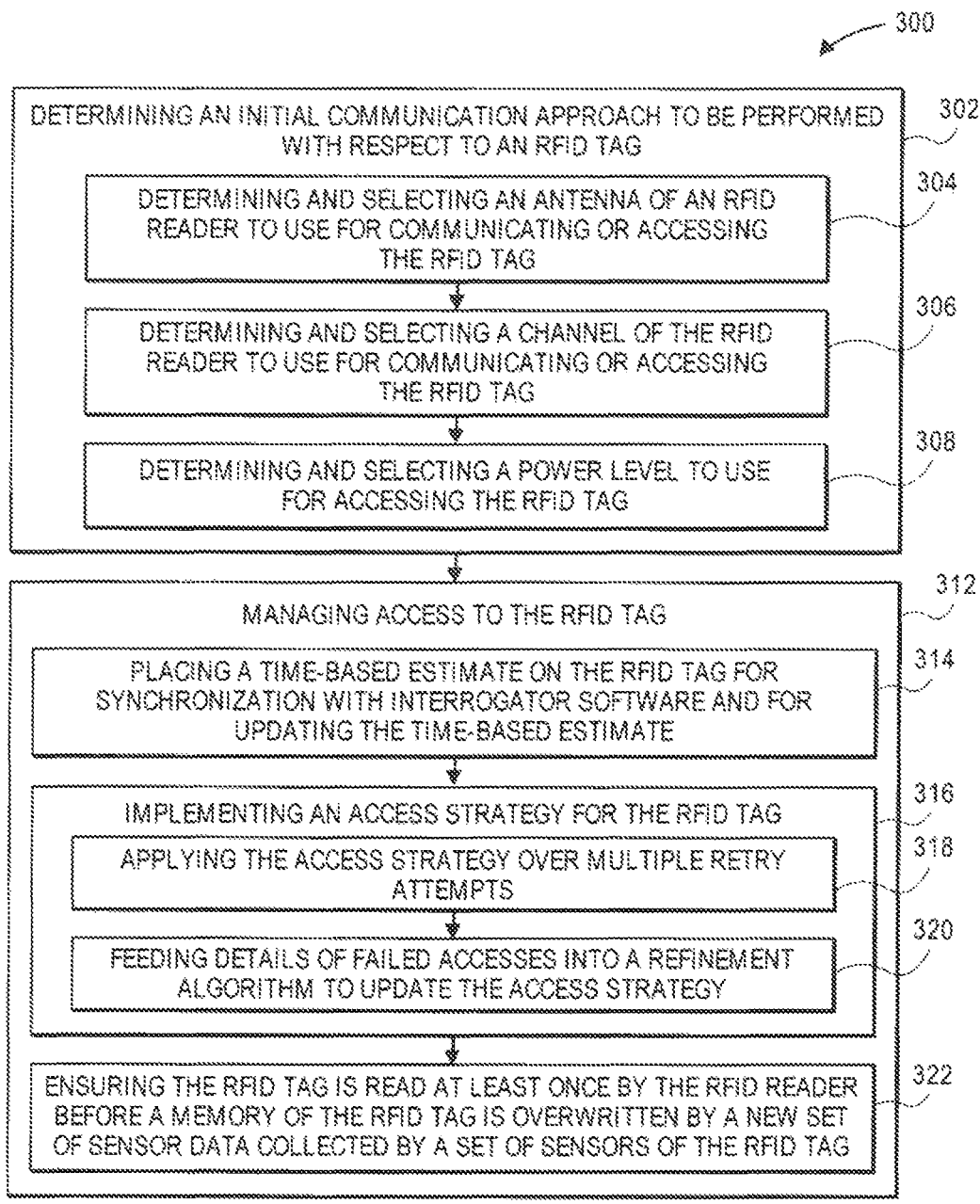
FIG. 3 illustrates a flowchart of a method for determining an initial strategy for the RFID reader to access sensor data on the RFID tag, refining that strategy over time, and using that strategy to wirelessly stream time-stamped, periodic data samples from the RFID tag to the RFID reader, according to an embodiment.

FIG. 3 illustrates a flowchart of a method 300 for determining an initial strategy for the RFID reader 200 to access sensor data on the RFID tag 500, refining that strategy over time, and using that strategy to wirelessly stream time-stamped, periodic data samples from the RFID tag 500 to the RFID reader 200 (performed by the RFID reader 200), according to an embodiment. A set of instructions ("interrogator software") stored on the memory of the processor 210 may be configured such that, when executed, the RFID reader 200 is caused to perform the method 300, as described below.

The method 300 may include determining an initial communication approach to be performed (by the RFID reader 200) with respect to each RFID tag 500 in a predetermined plurality of such RFID tags 500, as at 302. The initial communication approach may include determining and selecting which antenna(s) of the RFID reader 200 to use for communicating or accessing each RFID tag 500, as at 304. The initial communication approach may also or instead include determining and selecting which channel(s) of the RFID reader 200 to use for communicating or accessing each RFID tag 500, as at 306. The initial communication approach may also or instead include determining and selecting which power level(s) to use for accessing each RFID tag 500, as at 308. Steps 302, 304, 306, and/or 308 may be performed via human-machine interaction (e.g., via a GUI or other input control) or alternatively may be performed automatically and/or autonomously. In at least one embodiment, some of steps 302, 304, 306, and/or 308 may be performed via human-machine interaction while others of steps 302, 304, 306, and/or 308 may be performed automatically and/or autonomously.

The method 300 may also include managing access to each RFID tag 500 to allow for RFID tag sample rates up to several thousand samples per second, as at 312.

Managing access to each RFID tag 500 may include placing a time-based estimate on each RFID tag 500 for synchronization with the interrogator software and for updating the time-based estimate over the course of its operation, as at 314.

Managing access to each RFID tag 500 may include also implementing an access strategy for each RFID tag 500, as at 316. Implementing the access strategy may include applying the access strategy over multiple retry attempts as needed, as at 318. Implementing the access strategy may also or instead include feeding details of failed accesses into a refinement algorithm to update the access strategy over the course of its operation, as at 320. In at least one embodiment, the refinement algorithm in step 318 may be different and distinct from the refinement of the initial communication approach above.

Managing access to each RFID tag 500 may also include determining that each RFID tag 500 is read at least once by the RFID reader 200 before a memory of the RFID tag 500 is overwritten by a new set of sensor data collected by a set of sensors of each RFID tag 500, as at 322.

Figure 4:
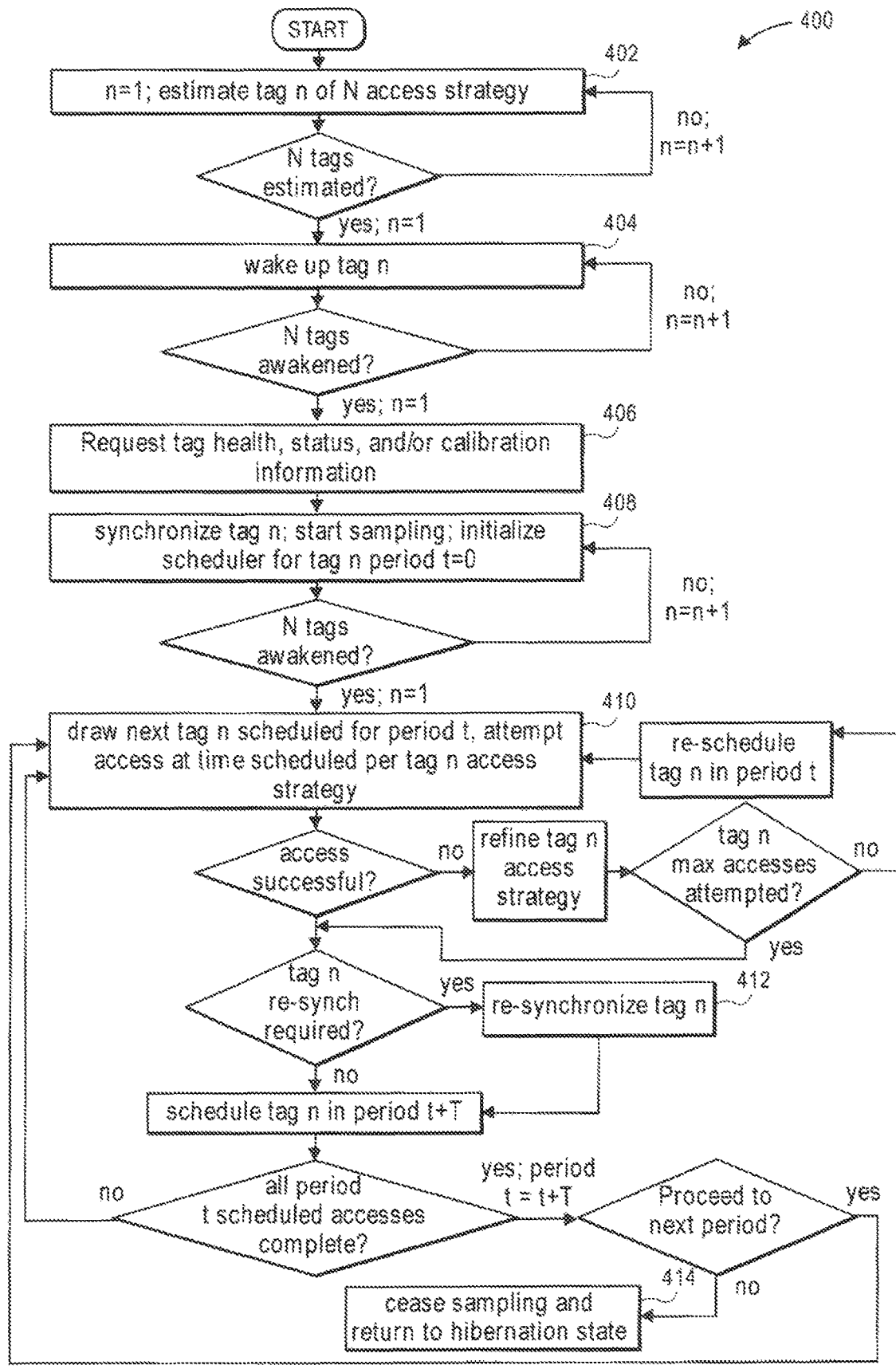
FIG. 4 illustrates a flowchart of a low-power wake-up and data interrogation protocol for the RFID reader, according to an embodiment.

FIG. 4 illustrates a flowchart of a method 400 for performing a low-power wake-up and data interrogation (by the RFID reader 200), according to an embodiment. The method 400 may include an instruction set to communicate with a population of N RFID tags 500 that may already be in a low-power sleep state. The RFID reader 200 first probes each RFID tag 500 to determine/estimate that tag's responsiveness to OTA RFID access and generate a per-tag access strategy, as at 402. The RFID reader 200 may, for example, exhaustively attempt the kinds of reads and writes used in the main data transport scheme over combinations of transmit channel, transmit power, and interrogator antenna selection. This exhaustive approach may yield a precise estimate of the optimal access strategy. The RFID reader 200 may alternatively use a quicker method sweeping an interrogation over all available antennas to gain a coarser estimate of the optimal access strategy that could then be further refined during data transport. The RFID reader 200 may be configured such that it does not disturb the RFID tag's hibernation or "sleep" state (as shown in FIG. 4), but if it does, the RFID reader 200 may optionally command each RFID tag 500 to return to sleep following this probing estimation. Following this initialization, when the RFID reader 200 is ready to begin acquiring data, it iterates through each of the N tags and instructs/commands one or more of the RFID tags 500 to wake up, as at 404. In at least one embodiment, tag health, status, and/or or calibration information for each RFID tag 500 may be requested next in a round-robin fashion, as shown at 406.

Next, the RFID reader 200 may iterate through each of the N RFID tags 500, synchronize with a sampling clock of each of the RFID tags 500, and command the clocks to begin sampling, as at 408. The time at which the first set of samples of the RFID tag 500 will be available for OTA reading is inserted into a scheduler, and upon expiration of this period, the scheduler triggers an attempt to read the memory of the RFID tag 500. If this attempt is unsuccessful, a retry later in the current sampling period may be scheduled. Unsuccessful retries may be re-scheduled up to a maximum number of attempts, which are set as a configuration parameter on the interrogator processor before operation. Once the RFID tag 500 has been successfully read, or the RFID reader 200 has tried and failed to read up to the maximum number of retries, an attempt to access that RFID tag 500 in the next period is scheduled, as at 410. The clock of the RFID tag 500 may be optionally re-synchronized at that point to keep it in lockstep with the clock of the RFID reader 200, as at 412. This process repeats for each RFID tag 500 for each period.

The details of unsuccessful initial tag accesses and retries may be noted and fed into the access refinement algorithm described in FIG. 3. These may include the interrogator antenna, channel, and power level used to access the RFID tag 500. Refinements may include selecting a different interrogator antenna, blacklisting sufficiently troublesome channels or increasing a score to be used in future blacklisting decisions, and changing the power level.

The method 400 is shown for this embodiment in FIG. 4 as having this process iterate ad-infinitum. It is also possible for the RFID reader 200 to interrupt this process (e.g., in response to an external stimulus, such as a stop-sampling command issued to the RFID reader 200) by issuing commands to a particular RFID tag 500 to cease sampling and return to a hibernation state, removing this particular RFID tag 500 from the tag access scheduler in the process, as at 414.

Figure 5:
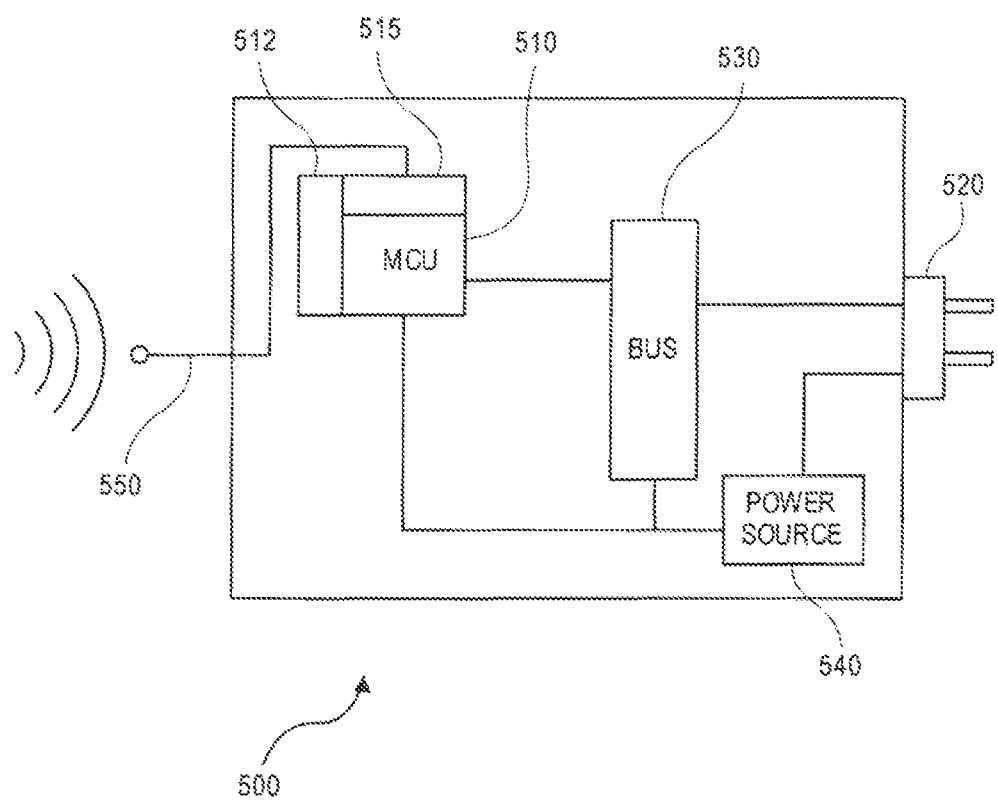
FIG. 5 illustrates a schematic view of the RFID tag from FIG. 1, according to an embodiment.

FIG. 5 illustrates a schematic view of the RFID tag 500, according to an embodiment. The RFID tag 500 may include a tag CPU or microcontroller unit (MCU) 510 having a memory 512, at least one sensor element 520 (e.g., a thermocouple element, a strain gauge, a carbon dioxide sensor, a light sensor, a temperature sensor, a humidity sensor, an air quality sensor, a low-bandwidth accelerometer, etc.) for sensing and collecting a data set of information, a communications bus 530, a power source 540, and at least one transceiving antenna 550.

The MCU 510 includes a set of instructions stored on its memory 512 to cause the RFID tag 500 to perform a set of steps as will be described in further detail below with reference to FIG. 7. Each sensor element 520 may be configured to sense a parameter of interest, (e.g., temperature when such sensor element is a thermocouple, presence of a chemical for a chemical sensor, strain for a strain gauge) to enable the collection of a set of information. The MCU 510 may further include at least one RFID tag module 515 for implementing a wakeup channel. The at least one RFID tag module 515 may be configured to generate a wakeup pulse signal when a particular data sequence is transmitted by the RFID reader 200 to the RFID tag module 515.

The transceiving antenna 550 may be connected to the RFID tag module 515 for receiving data sequences and for transmitting a set of information collected from the at least one sensor element 520. The power source 540 may maintain the tag state when not under interrogation by the RFID reader 200. In one embodiment, the power source 540 may be or include a consumable battery. In another embodiment, the power source 540 may be or include a power harvester coupled with a power storage device. In yet another embodiment, the power source may be or include a combination of both a consumable power supply and a power harvester.

Accordingly, tag operation (e.g., hibernating, wakeup, and sampling) may be powered entirely by using power harvested from the data sequence transmitted by the RFID reader 200. In such an embodiment, the power source 540 may be configured to harvest power from the transmitted signal of the RFID reader 200 or another source of ambient energy (e.g., thermal gradients). In another embodiment, a portion of the operating power may be generated by using power harvested from the data sequence of the RFID reader 200, with the remaining power being provided by another power supply integrated with a power harvester contained within power source 540, such as a battery. In yet another embodiment, the power source 540 may include a battery without a power harvester.

As shown in FIG. 5, the RFID tag module 515 may be an integrated circuit module internal to the MCU 510. In another embodiment, the RFID tag module 515 may be a distinct integrated circuit connected via a circuit bus (e.g., serial interface) to MCU 510, similar to the configuration shown in FIG. 6, which is described below.

Figure 6:
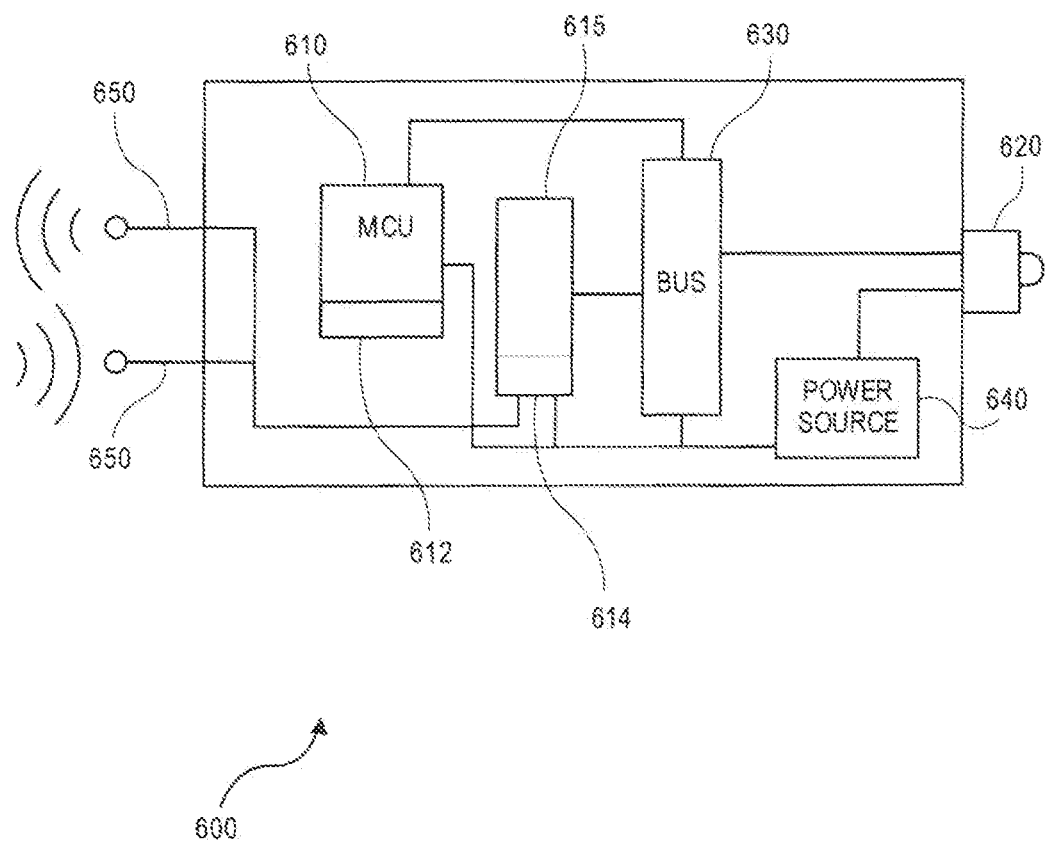
FIG. 6 illustrates a schematic view of another RFID tag (similar to the RFID tag in FIG. 5) including a distinct integrated circuit connected via a serial interface to a low-power micrcontroller unit (MCU), according to an embodiment.

FIG. 6 illustrates a schematic view of another RFID tag 600 (similar to the RFID tag 500 in FIG. 5) including a distinct integrated circuit connected via a serial interface to a low-power MCU, according to an embodiment. The RFID tag 600 may include at least one RFID tag module 615 for implementing a wakeup channel. The RFID tag 600 may also include an MCU 610 configured to periodically wake itself from a low power state (either on a schedule or driven by an external interrupt) and monitor the RFID tag module 615 for the presence of a particular data sequence. The RFID tag module 615 may be a distinct integrated circuit connected via a circuit bus 630 (e.g., serial interface).

The RFID tag 600 may use a new class of serial-addressable EPC Global C1G2 RFID integrated circuits (ICs) for the RFID tag module 615. Such an IC, in addition to being a C1G2-compliant RFID device, adds a serial interface (e.g., SP1, I2C, UART) through which the C1G2 memory banks can be read or written by an attached device, such as a small microcontroller. The RFID reader 200 may provide the power to read/write tag module memory 614 inside tag module 615 using the OTA interface, and the attached processor 610 provides the set of instructions (which may be stored in MCU memory 612 in one embodiment) to read/write tag module memory 614 using the serial interface and configure interrupt-based wakeup, should the service be provided by the RFID IC. When neither interface is engaged, the RFID IC may be completely powered down.

Though the memory architecture of the RFID tag 500\600 may vary (e.g., EEPROM, FRAM, etc.), all serial-addressable tags may share one common feature: reading/writing tag memory consumes relatively little power compared to the power draw of active transmitter/receiver protocols such as BLE, ZigBee, and Wi-Fi. Thus, an RFID reader 200 can write data using the OTA interface to an RFID tag memory bank using only power from the RFID reader 200, and then, with only a small cost to the integrated tag/processor device's power supply, the processor can read the data out over the serial interface.

The RFID tag 600 may also include at least one RF transceiving antenna 650 (two are shown) operatively connected to the RFID tag module 615 for receiving data sequences and for transmitting a set of information collected from the at least one sensor element 620. As described earlier with reference to the RFID tag 500 of FIG. 5, the RFID tag 600 may also include a power source or supply 640 to maintain tag state when not under interrogation by the RFID reader 200. In one embodiment, the power source 640 may be a consumable battery. In another embodiment, the power source 640 may be a power harvester coupled with a power storage device. In yet another embodiment, the power source 640 may be a combination of a both consumable power supply (e.g., a button battery) and a power harvester.

Figure 7:
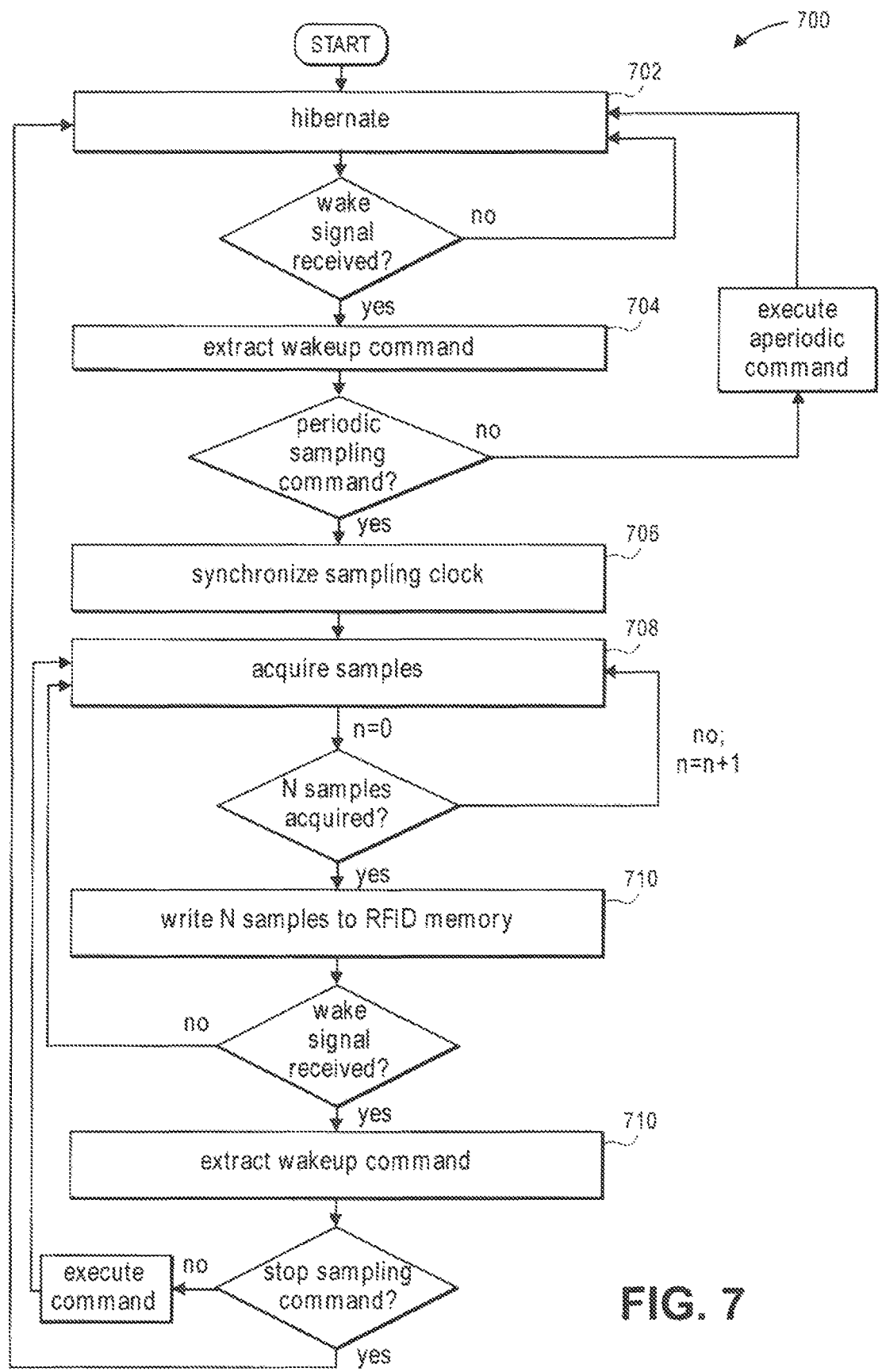
FIG. 7 illustrates a flowchart of a low-power hibernation and data streaming protocol for the RFID tag, according to an embodiment.

FIG. 7 illustrates a flowchart of method 700 for performing a low-power hibernation and data streaming protocol for the RFID tag 500/600, according to an embodiment. The method 700 may include a set of instructions that causes the RFID tag 500/600 to perform acts in a series of steps responsive to communication received from the RFID reader 200. In particular, the set of instructions, referred to herein as "tag software" stored on the MCU, may cause the tag 500/600 to interact with the RFID reader 200 via read/write commands issued from the RFID reader 200 to the RFID module. The MCU 510/610 may be commanded by the interrogator software to (1) enter a low-power (e.g., sleeping/hibernating state) from an active state: (2) wake up from a sleeping state to an active state; (3) begin acquiring data from its at least one sensor element 520/620 at a rate up to several thousand samples per second; and/or (4) write that data to memory bank on the RFID interface 515/615 on a schedule compatible with the RFID reader access strategy or schedule. In at least one embodiment, the MCU 510/610 may also be commanded to (5) perform a one-time action (e.g., health/status check) and re-enter a low-power state.

The MCU 510/610 has a memory 512/612 that includes a set of instructions for receiving a time-base synchronization signal from the RFID reader 200 through the RFID module 515/615 and updating/refining the time base maintained by the MCU 510/610 using such synchronization data over the course of operation. The steps for maintaining synchronization includes a step for efficiently encoding timestamps of a sequence of data samples. The set of instructions also includes a method for maintaining concurrent acquisition of a new sequence of data samples on the MCU 510/610 while downloading (i.e., communicating) a previous sequence of data samples from the memory bank of the RFID tag module 515/615 to the RFID reader 200.

During data acquisition by the RFID tag 500/600, the tag software includes a set of instructions that cause the RFID tag 500/600 to enter a low-power state automatically and/or autonomously when the tag is (1) not actively gathering data samples from sensor element 520/620 and/or (2) not actively writing data samples to the memory bank of RFID module 515/615.

Further, during data acquisition by the RFID tag 500/600, the tag software includes a set of instructions that cause the R FID tag 500/600 to return to a high-power state automatically and/or autonomously per the data sampling schedule to (1) gather data samples from the at least one sensor element 520/620 and/or (2) write data samples to the RFID tag module memory 512/614.

The tag 500/600 begins in a low-power (e.g., sleeping/hibernating) state after booting up, as at 702. Upon receipt of a wake-up signal from the RFID reader 200, the RFID tag 500/600 extracts, decodes, and interprets the command embedded in the wake-up signal, as at 704. If the command encodes an aperiodic action (e.g., generating a calibration value set, issuing a health and status report, changing the RFID tag sample rate, reporting the existing state of any configuration parameter, and/or implementing any other configuration command), the RFID tag 500/600 performs that action and then returns to sleep. If that command encodes a periodic action (e.g., periodic sensor sampling), the RFID tag 500/600 synchronizes its sampling clock with the clock of the RFID reader 200, as at 706. The RFID tag 500/600 then begins acquiring a fixed-length block of samples, as at 708. The length is either hard-coded in the tag software or embedded as an argument in the interrogator command.

Once the block of samples is acquired, it may be written into the memory of the RFID tag 500/600, as at 710. The RFID tag 500/600 may then acquire the next round of samples. OTA commands from the RFID reader 200 can interrupt this process, either to command the RFID tag 500/600 to re-synchronize its sampling clock and resume sampling or to return to a low-power sleep state after completion of some other aperiodic command.

The tag software also includes a set of instructions to cause the RFID tag 500/600 to (1) cease acquiring data and enter an idle state and/or (2) execute any other configuration/sampling access strategy directed by the interrogator software.

In light of the principles and exemplary embodiments described and illustrated herein, it will be recognized that the exemplary embodiments can be modified in arrangement and detail without departing from such principles. Also, the foregoing discussion has focused on particular embodiments, but other configurations are contemplated. In particular, even though expressions such as "in one embodiment," "in another embodiment," "in a version of the embodiment" or the like are used herein, these phrases are meant to generally reference the range of possibilities of embodiments, and are not intended to limit the disclosure to the particular embodiments and configurations described herein. As used herein, these terms may reference the same or different embodiments that are combinable into other embodiments.

Similarly, although exemplary processes have been described with regard to particular operations performed in a particular sequence, numerous modifications could be applied to those processes to derive numerous alternative embodiments of the present disclosure. For example, alternative embodiments may include processes that use fewer than all of the disclosed operations, processes that use additional operations, and processes in which the individual operations disclosed herein are combined, subdivided, rearranged, differently ordered or otherwise altered.

In view of the wide variety of useful permutations that may be readily derived from the exemplary embodiments described herein, this detailed description is intended to be illustrative only, and should not be taken as limiting the scope of the disclosure.

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings. Moreover, the order in which the elements of the methods described herein are illustrate and described may be re-arranged, and/or two or more elements may occur simultaneously. The embodiments were chosen and described in order to best explain their practical applications, to thereby enable others skilled in the art to best utilize the various embodiments with various modifications as are suited to the particular use contemplated.

What is claimed is:

1. A method for performing low-power hibernation and data streaming, comprising:
    receiving, at a radio-frequency identification (RFID) tag, a wake-up command from an RFID reader, wherein the wake-up command comprises a periodic action;
    synchronizing a sampling clock of the RFID tag with a sampling clock of the RFID reader in response to the wake-up command;
    acquiring a block of samples using the RFID tag;
    writing the block of samples into a memory of the RFID tag, wherein the RFID tag includes at least one or more processors, a sensor element configured to acquire the block of samples, and at least one battery configured to power the sensor element;
    storing instructions on a memory system comprising one or more non-transitory computer-readable media;
    executing the instructions by at least one of the one or more processors to cause the RFID tag to perform operations, the operations including:
        transitioning the RFID tag from a hibernation state where the sensor element is in a non-data-gathering mode to an active state where the sensor element is in a data-gathering mode in response to the wake-up command;
        during the hibernation state, powering the memory system with the at least one battery;
        during the active state, performing periodic sensor sampling to acquire sensor data from the sensor element and transmitting the acquired sensor data from the memory system to the RFID reader over a telemetry interface powered by power harvested from the RFID reader; and
        during the active state, performing a streaming service where the sensor data is constantly generated by the sensor element and transmitted to the RFID reader; and
    powering the sensor element with the at least one battery during the data-gathering mode.

2. The method of claim 1, wherein the block of samples has a fixed length.

3. The method of claim 2, wherein the fixed length is embedded as an argument in the wake-up command.

4. The method of claim 1, further comprising:
    receiving, at the RFID tag, a command from the RFID reader after the block of samples is written into the memory of the RFID tag, wherein the command comprises an aperiodic action; and
    returning to a sleep state after performing the aperiodic action.

5. The method of claim 4, wherein the aperiodic action comprises one or more of the following steps: (a) generating a calibration value set; (b) issuing a health and status report; (c) changing the RFID tag sample rate; (d) reporting the existing state of any configuration parameter; and (e) implementing any other configuration command.

6. A radio-frequency identification (RFID) system, comprising:
    one or more processors;
    a memory system comprising one or more non-transitory computer-readable media storing instructions that, when executed by at least one of the one or more processors, cause the system to perform operations, the operations comprising:
        receiving, at an RFID tag, a wake-up command from an RFID reader, wherein the wake-up command comprises a periodic action;
        synchronizing a sampling clock of the RFID tag with a sampling clock of the RFID reader in response to the wake-up command;
        acquiring a block of samples using the RFID tag; and
        writing the block of samples into a memory of the RFID tag;

a sensor element configured to acquire the block of samples; and at least one battery configured to power the sensor element;

wherein the operations performed by the system further comprise:

commanding the RFID tag to transition from a hibernation state in which the sensor element is in a non-data-gathering mode to an active state in which the sensor element is in a data-gathering mode responsive to the wake-up command;

during the hibernation state, powering the memory system with the at least one battery;

during the active state, performing periodic sensor sampling to acquire sensor data from the sensor element and transmitting the sensor data from the memory system to the RFID reader over a telemetry interface powered by power harvested from the RFID reader; and, during the active state, performing a streaming service where the sensor data is constantly generated by the sensor element and transmitted to the RFID reader; and powering the sensor element with the at least one battery during the data-gathering mode.

7. The system of claim 6, wherein the block of samples has a fixed length.

8. The system of claim 7, wherein the fixed length is embedded as an argument in the wake-up command.

9. The system of claim 6, wherein the operations further comprise:

receiving, at the RFID tag, a command from the RFID reader after the block of samples is written into the memory of the RFID tag, wherein the command comprises an aperiodic action; and returning to a sleep state after performing the aperiodic action.

10. The system of claim 9, wherein the aperiodic action comprises a one-time health or status check.

* * * * *